Sept. 19, 1967   D. L. TROESH   3,343,123
AUDIBLE TURN INDICATOR
Filed Dec. 11, 1964
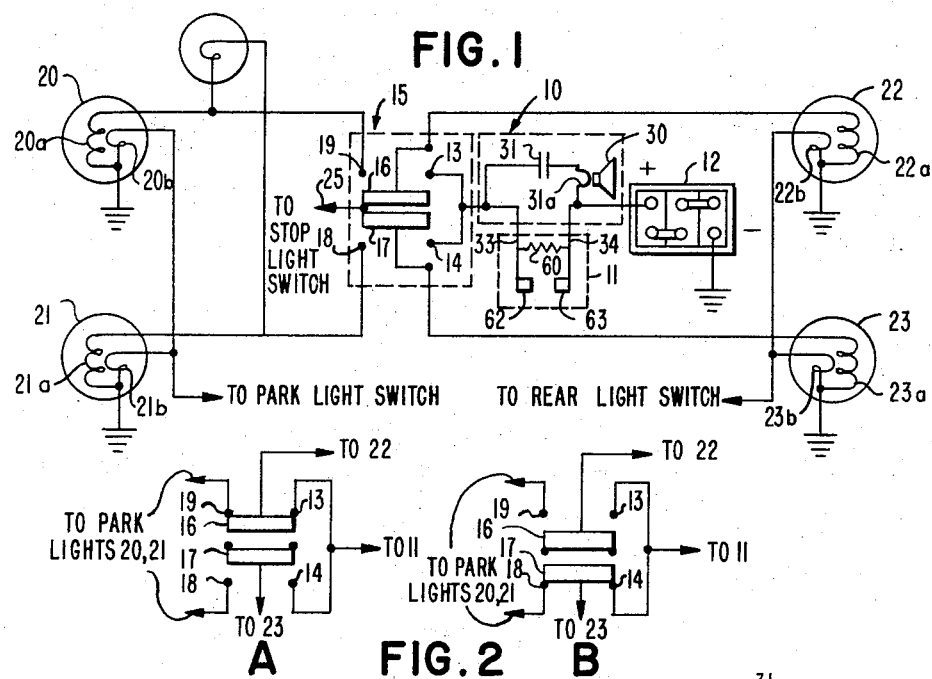
FIG. 1
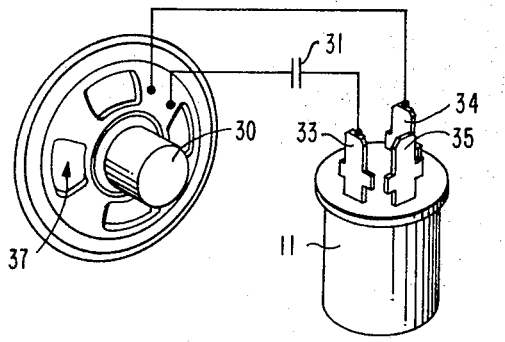
FIG. 2
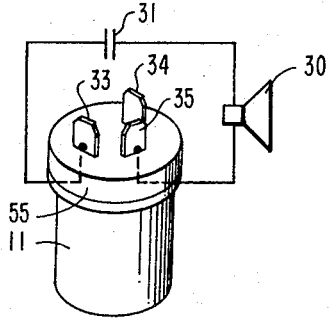
FIG. 3
FIG. 4
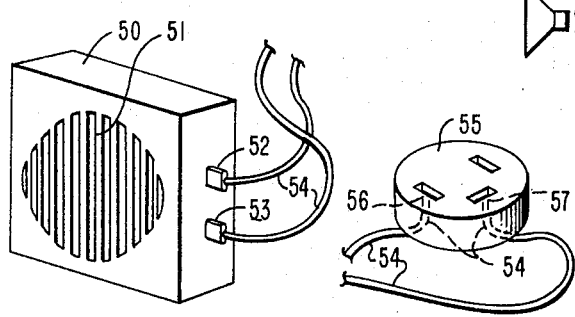
FIG. 5
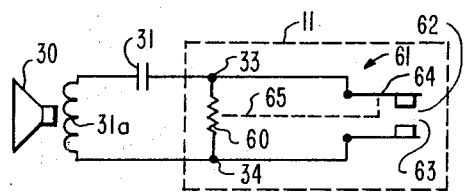
FIG. 6
INVENTOR.
DONALD L. TROESH
BY Norman L. Chalfin
AGENT

United States Patent Office 3,343,123
Patented Sept. 19, 1967

3,343,123
AUDIBLE TURN INDICATOR
Donald L. Troesh, 2012 Mountain Ave.,
Duarte, Calif. 91010
Filed Dec. 11, 1964, Ser. No. 417,673
3 Claims. (Cl. 340—75)

This invention relates to automotive turn indicator devices and more particularly to an audible signal means for indicating that such turn indicators are still in operation when in fact their operation should have terminated.

One of the most disturbing problems related to the operation of turn indicator devices in automobiles is the fact that when a shallow turn has been made the zero return operation of the turn indicator is ineffective and in the ambient noise of the road one cannot hear the "clicking" of the circuit interruptor device which causes the flashing of the turn indicator lamps. In some jurisdictions it is a citable traffic offense to have turn indicator lamps running or flashing when in fact there is no intention on the part of the vehicle operator to make a turn.

Accordingly it is desirable that some auxiliary means be provided to call to the attention of a vehicle operator the fact that his turn indication lamps are flashing on and off when he is not about to make a turn, or that the flashing of the lamps is continuing after the turn has been completed.

This invention contemplates a simple and effective audible signal means for calling attention of the operator of an automotive vehicle to the fact that his turn indicator lamps are flashing.

The means by which this audible turn indicator is accomplished is in the use of a capacitor and transducer which may be a permanent magnet type of loudspeaker connected with the turn indicator flasher in such a manner that for each interruption cycle of the flasher device an audible click or similar sound will be heard in the transducer device.

Accordingly it is an object of this invention to provide an audible signal generating device responsive to the interruption cycles of an automotive turn indicator lamp flasher unit to produce periodic sounds corresponding thereto.

It is another object of this invention to provide a transducer and capacitor connected in series across the terminals of an automotive turn indicator lamp flasher device to produce an audible signal for each cycle of operation of said flasher device.

It is still another object of this invention to provide a loudspeaker means connected with an automotive turn indicator flasher to produce an audible signal so long as the flasher continues to operate.

These and other objects of this invention will become more clear from the specification which follows taken together with the drawings wherein there is shown a preferred embodiment of the invention.

It is to be clearly understood that the embodiments shown are illustrative only and are not to be construed as limiting the invention thereto since those skilled in the arts related to this invention will be able to devise other embodiments in the light of the teachings herein within the ambit of the appended claims.

In the drawings:

FIGURE 1 is a schematic diagram of a typical turn indicator circuit system used in automotive vehicles showing the connection of the audible indicator of this invention thereto;

FIGURE 2 shows in schematic form the partial connections of items in FIGURE 1 to show the left-right switching operations thereof;

FIGURE 3 is a partially perspective and partially schematic view of the arrangement of this invention showing the connections of the components thereof to a typical flasher unit;

FIGURE 4 is a further embodiment of the invention shown schematically;

FIGURE 5 is a perspective view with parts broken to show a complete assembly, according to this invention, of an embodiment thereof; and FIGURE 6 is a schematic circuit of the invention in operation in connection with a flasher unit.

Referring now to the figures, in which like elements bear identical reference characters, whether they are in illustrative or in schematic form, a typical turn indicator circuit is shown with the dashed box schematic 10 of this invention connected to the flasher unit 11 therein.

Flasher unit 11 can be seen to be connected in series with a source of voltage such as battery 12 through a turn indicator switch device 15 to parking light and rear light assemblies 20–23. The loudspeaker 30 and capacitor 31 forming assembly 10 are connected in parallel with the contact terminals 33–34 of flasher unit 11. Terminals 13–14 of switch 15 are connected together and to one terminal 33 of flasher unit 11. Whenever lever arms 16–17 come into contact with respective pairs of terminals 13–19 or 14–18, an appropriate pair of lamps such as 20–22 or 21–23 are placed in series with flasher unit 11 so as to operate them intermittently. This may be seen in some detail with reference to FIGURE 2. In FIGURE 2a the contacting of terminals 13 and 19 with lever arm 16 is seen. In FIGURE 2b the contacting of terminals 17 and 18 with lever arm 17 is seen.

In FIGURE 3 to which reference is now made a loudspeaker unit 30 is shown connected through a schematically represented capacitor 31 to contact terminals 33 and 34 of flasher unit 11. In this instance the connections are shown as they may be soldered to the terminals in a relatively permanent connection.

In FIGURE 4 a terminal contact plate 55 can be seen arranged so as to fit over contact terminals 33–34 and 35. It should be noted that some of the flasher units marketed today are two terminal and some three terminal units. Particularly units may be connected as shown in FIGURE 3 and others as shown in FIGURE 4. Still others not shown may have but two terminals altogether. In any case the leads of the capacitor and loudspeaker series combination are connected to the two terminals of the flasher unit 11 which are the on-off flashing connections thereof.

In FIGURE 5 a representative embodiment of the invention is shown as it may be assembled for use as a package in a case 50. The speaker diaphragm 37 (not shown in this figure) would normally face the rebbed aperture 51 and the capacitor 31 would be internal and therefore not visible. The case 50 may have insulated there from external terminals 52–53 to which leads 54 are connected either by means of lug clips or by soldering. Leads 54 (shown broken) connect to socket apertures 56 and 57 in a connecting plate 55. Socket apertures include contact components of known types to engage terminal lugs 33–35 or 33–34 in accordance with the appropriate internal connection plan of flasher unit 11. Connecting plate or disc in otherwise of an insulative material.

The particular advantage of a connecting plate such as 55 is that as may be seen in FIGURE 4 it may be slipped over the flasher unit 11 and flasher unit 11 may still be inserted in its normal socket receptacle in the automobile without requiring soldering or other wire connection practices known to the art. This does not, however, preclude a form of permanent installation by such soldering or other connection means.

As may be seen in FIGURE 6 terminals 33 and 34 constitute switch terminals which are connected with contacts 62–63 of switch 61 within flasher unit 11. A thermal element such as 60, which may be a bimetallic element of dissimilar metals is connected between terminals 33–34 so that it is distorted upon heating. The bimetallic element 60 when heated will deform one of the contact elements 62 or 63 and cause it to come in contact with the other closing the circuit therethrough, and thereby removing power from the element 60. Thereupon element 60 is cooled permitting the bimetallic portion to return to normal, which opens the circuit so that the electric energy again flows through element 60, repeating the cycle.

It may be seen therefore that when the loudspeaker 30 and capacitor 31 are connected in series between the terminals 33–34 or 33–35, as the case may be, during the period when contacts 62–63 are open current will flow steadily in element 60 as soon as turn indicator switch 15 is operated, contacts 62–63 will close when element 60 is heated sufficiently by the flow of current therethrough. The sudden change in circuit resistance at this point (in parallel with loudspeaker 30 and capacitor 31) to a short, creates a "pop" or "click" sound in loudspeaker 30 due to the suddenly more rapid discharge of capacitor 31 which during the current flow in thermal (or resistive) element 60 had been charging at some rate through the voice coil 31a of speaker 30.

Upon the reopening of contacts 62–63 when the thermal element cools the recharging of capacitor 31 proceeds with a surge, initially, producing another sound in the loudspeaker due to the displacement of the voice coil accompanying the current of the initial charging surge.

Accordingly there has been described hereinabove a series circuit combination of a loudspeaker or other transducer and a capacitor connected as described between the flasher contacts of an automotive turn indicator flasher unit. The alternate on-off operations of the flasher unit result in charging and discharging currents in the capacitor-voice-coil combination which produce audible "click" or other sharp sounds in the loudspeaker to warn the operator of a vehicle, in which the audible indicator according to this invention is installed, that the flasher element is still operating, if it should continue beyond the time required to complete the turn being indicated.

What is claimed as new is:

1. In combination with a battery, indicator lamps and an automotive turn indicator flasher unit having a pair of contacts intermittently opened and closed during a turn indication operation thereof to intermittently flash the indicator lamps on and off during the operation of the flasher unit, an audible turn indicator comprising:
    a transducer device having a diaphragm therein connected on a voice coil having two terminals; and
    a capacitor having two terminals, one of which is connected to one terminal of said voice coil forming a series connection of said voice coil and said capacitor,
    the free terminal of said capacitor and the free terminal of said voice coil being connected respectively, each to one of said pair of contacts of said flasher unit,
    the contact of said flasher unit connected to said loudspeaker free terminal being also connected to one side of the battery and the contact of said flasher unit connected to said free terminal of said capacitor returning through said lamps to the other side of said battery,
    whereby during each intermittent opening and closing of said contacts the consequent charge and discharge of said capacitor will result in audible clicks in said transducer device arising out of displacement of said diaphragm due to the resulting charge and discharge currents therein.

2. In combination with an automotive turn indicator flasher unit having a pair of contacts between the automobile battery and a turn indicator circuit which are intermittently opened and closed during a turn indication operation thereof, an audible turn indicator comprising:
    a loudspeaker unit having a diaphragm therein connected on a voice coil said voice coil having two terminals; and
    a capacitor having two terminals one of which is connected to said voice coil,
    the free terminal of said capacitor and the free terminal of said voice coil being connected respectively each to one of said pair of contacts of said flasher unit,
    whereby during each intermittent opening and closing of said contacts the consequent charge and discharge of said capacitor will result in audible clicks in said transducer device, arising out of the displacement of said diaphragm due to the resulting charge and discharge of the battery currents therein.

3. An audible turn indicator comprising the combination of:
    a flasher unit normally interconnected in an automotive system with a battery, turn indicator switch and turn indicator lamps, said flasher unit having a pair of contacts intermittently opened and closed during operation thereof;
    a housing;
    a contact plate;
    a loudspeaker having a diaphragm therein connected on a voice coil said voice coil having two terminals; and
    a capacitor having two terminals one of which is connected in series with said voice coil,
    said loudspeaker and said capacitor being enclosed in said housing,
    the free terminal of said capacitor and the free terminal of said voice coil being connected respectively to said contact plate wherein the contacts thereof are connected to said pair of contacts of said flasher unit said capacitor being charged from said battery while said contacts are open and discharged through said loudspeaker when said contacts are closed,
    and whereby during each intermittent opening and closing of said contacts the consequent charge and discharge of said capacitor will result in audible clicks in said transducer device, due to the displacement of said diaphragm due to the resulting charge and discharge currents therein.

References Cited

UNITED STATES PATENTS

| 2,437,876 | 3/1948 | Cohn | 340—384 |
| 2,896,190 | 7/1959 | Gallaro et al. | 340—75 |
| 2,988,708 | 6/1961 | Schmidt | 340—384 |
| 3,022,498 | 2/1962 | Alcott | 340—384 |
| 3,220,732 | 11/1965 | Pincus | 340—384 |

NEIL C. READ, *Primary Examiner.*

I. J. LEVIN, *Assistant Examiner.*